United States Patent [19]

Hinz et al.

[11] 4,330,788

[45] May 18, 1982

[54] PRINTING DEVICE FOR ELECTROPHORETIC RECORDING

[75] Inventors: Hans D. Hinz, Tornesch; Ulf Rothgordt, Norderstedt; Herbert Löbl, Hamburg, all of Fed. Rep. of Germany

[73] Assignee: U.S. Philips Corporation, New York, N.Y.

[21] Appl. No.: 126,940

[22] Filed: Mar. 4, 1980

[30] Foreign Application Priority Data

Mar. 5, 1979 [DE] Fed. Rep. of Germany ....... 2908446
Nov. 6, 1979 [DE] Fed. Rep. of Germany ....... 2944708

[51] Int. Cl.[3] .................... G01D 15/06; B01D 13/02; C25D 1/12; G03G 15/00

[52] U.S. Cl. .................................... 346/157; 430/35; 430/36; 204/299 R; 204/300 R; 355/3 P

[58] Field of Search .................. 346/153, 157, 140 IJ, 346/140 R, 155; 355/3 P, 4; 430/32, 42, 35, 36; 101/1 R, DIG. 13; 118/647, 648, 659, 660, 645; 204/299 PE, 300 PE, 181 PE; 358/75, 300; 340/787

[56] References Cited

U.S. PATENT DOCUMENTS 3,052,213 9/1962 Schaffert ........................ 118/659 X
3,196,832 7/1965 Zin ...................................... 118/660
3,373,437 3/1968 Sweet et al. ................ 346/140 IJ X
3,523,158 8/1970 Zaphiropoulos ............... 346/157 X
3,656,173 4/1972 Fussel ............................ 118/659 X
3,945,020 3/1976 Krau et al. ................. 346/140 IJ X
3,956,756 5/1976 Paton ..................................... 358/75
3,975,740 8/1976 Distler et al. .............. 346/140 IJ X
4,146,324 3/1979 Komori et al. ................. 118/660 X
4,148,274 4/1979 Stievenart et al. ............ 118/660 X
4,181,094 1/1980 Gardiner ........................ 118/660 X

FOREIGN PATENT DOCUMENTS 2727261 12/1977 Fed. Rep. of Germany .

*Primary Examiner*—Aristotelis M. Psitos
*Attorney, Agent, or Firm*—Paul R. Miller

[57] ABSTRACT

The invention relates to a printing device for electrophoretic recording by means of electrodes which are relatively movable with respect to an image carrier. Between the image carrier and electrodes, a liquid developer fluid is present in which the electrodes are immersed. Recording takes place under the influence of a control voltage ($U_{ST}$) causing adherence of electrophoretic pigment to the image carrier. In order to enable point-like (matrix-like) recording, the surface of the image carrier is electrically conductive and the developer fluid at the area of the electrodes is continuously exchanged to maintain the electrophoretic pigment supply.

15 Claims, 8 Drawing Figures

PRINTING DEVICE FOR ELECTROPHORETIC RECORDING

Figure 1:
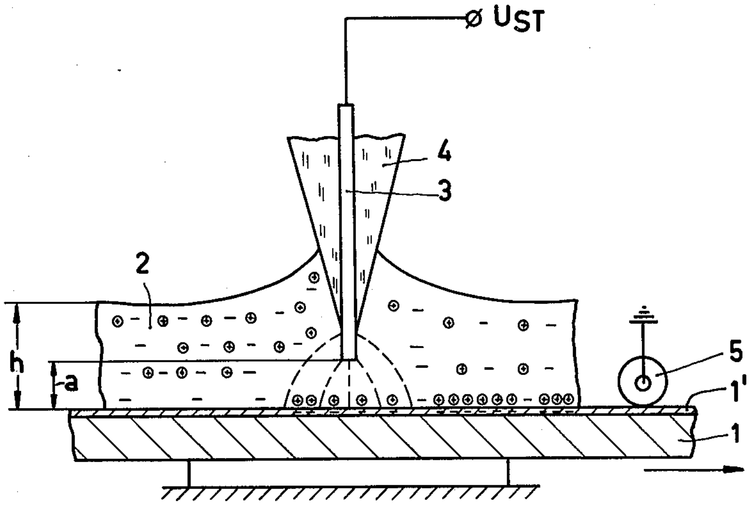

The invention relates to a printing device for electrophorectic recording, comprising at least one electrode which is movable relatively with respect to an image carrier and a developer liquid which contains pigment, contacts the image carrier and wets the electrode, and structure for applying an electric field between electrode and image carrier, recording being realized by adherence of the pigment to the image carrier by mirror charging.

Such printing devices are known, for example from German Offenlegungsschrift No. 27 27 261. This known device concerns a copying apparatus in which the image of an original document inserted into the apparatus is optically imaged on a photoconductor matrix of a flat transformation plate. As a result, a voltage pattern which corresponds to the image is generated on an electrode matrix which is situated on the other side of the plate and which is connected to the photoconductor layer acting as a voltage divider. Thus, a grey scale image which corresponds to the original image is electrophoretically formed on a dielectric image carrier by deposition of charged pigment from a liquid developer film present between the electrode matrix of the plate and the image carrier.

This known method has a number of drawbacks. First of all, the maximum achievable optical density of the image formed is limited by the layer capacitance of the dielectric image carrier. Moreover, the ions charged in the same sense which are present in the liquid developer do not make a contribution to the density, but instead reduce the pigment deposition by a substantial amount. The layer capacitance, moreover, determines the deposition rate. The layer capacitances required to achieve a substantial density imply a long recording time. Conversely, short recording times can be realized only by way of low layer capacitances. Furthermore, it then has to be accepted that the density which can be achieved is lower. For image recording with adequate density, the use of dielectric image carriers necessitates the use of liquid developers in which pigment of low charge is suspended. This causes a further reduction of the speed of deposition, i.e. of recording.

A further drawback arises in that during the image recording, deposition of pigment and ions in the electric field evolving from each electrode causes spatial charging of the layer capacitance of the image carrier. Consequently, when the charging increases, the pigment particles which are yet to be deposited are driven to image point zones which are situated ever further. The resultant resolution is less than that dictated by the geometry of the electrode matrix.

Printing devices utilizing an electrostatic recording method for the point-wise formation of images are known to use separate electrodes or electrode combs which are moved relatively with respect to the image carrier. Therefore, the use of such electrodes with a relative movement between image carrier and electrodes is also feasible for electrophoretic recording. The space between the electrode or the electrode comb and the image carrier should then be filled with liquid developer containing pigment and during the relative movement, control signals should be applied to the electrode device as necessary (see also German Offenlegungsschrift No. 21 47 536).

When a printing device thus formed is used for pointwise image formation, most of the liquid developer whose toner content has decreased accordingly in the electric field of an electrode during the formation of an image point is dragged along during the further movement until the recording of the next image point. As a result, the recording of this image point is not tonally correct. The undesirable displacement of the liquid developer depleted due to the recording is caused by the flat geometry of the electrode device and by the necessarily small dimensions (approximately 100 $\mu$m) of the gap filled with developer.

This is applicable to series recording (separate electrode) as well as to parallel recording (electrode comb).

It is an object of the invention to provide an electrophoretic printing device which enables the pointwise electrophoretic image formation by means of the control signals applied to the pin electrode device which is moved relatively with respect to the image carrier to be performed faster, with a higher achievable density, with more exact halftone reproduction, and with a higher resolution.

To this end, the device in accordance with the invention is characterized in that the surface of the image carrier which faces the electrodes is electrically conductive, a jet nozzle for the continuous supply of developer liquid to the surface of the image carrier is arranged just before the electrode or at the area of the electrode, viewed in the direction of movement of the image carrier, while behind the electrode there is arranged a device for the removal of depleted developer liquid.

In comparison with known devices for electrophorectic image formation, the proposed device offers important advantages. The suitably conductive surface of the image carrier is not charged by the charged pigment deposited during the image formation, because the corresponding counter-charge flows directly to the surface and compensates for the pigment charge. Thus, the quantity of pigment which can be deposited is not limited, not even by the participation of deposited ions, which are charged in the same sense, and which do not make a contribution to the density.

No spatially expended charge image is formed and hence there is no resolution reducing displacement of deposited pigment to the outer image point zones. Due to the high conductivity of the surface of the image carrier and the use of liquid developer in which the high-charge pigment particles are suspended, a high deposition rate is obtained by way of fast image formation and a high optical density.

A printing device thus formed also enables electrophoretic halftone recording of images with a higher achievable density on the conductive transparent metal layer of a transparent foil of a synthetic material having a sufficient thickness for adequate mechanical stability.

A further embodiment of the device in accordance with the invention which is suitable for color printing is characterized in that, viewed in the movement direction of the image carrier, a number of jet nozzles are arranged one behind the other, each jet nozzle being adapted to supply developer liquid with a specific pigment.

Some embodiments in accordance with the invention will be described in detail hereinafter with reference to the accompanying diagrammatic drawing figures.

Figure 2:
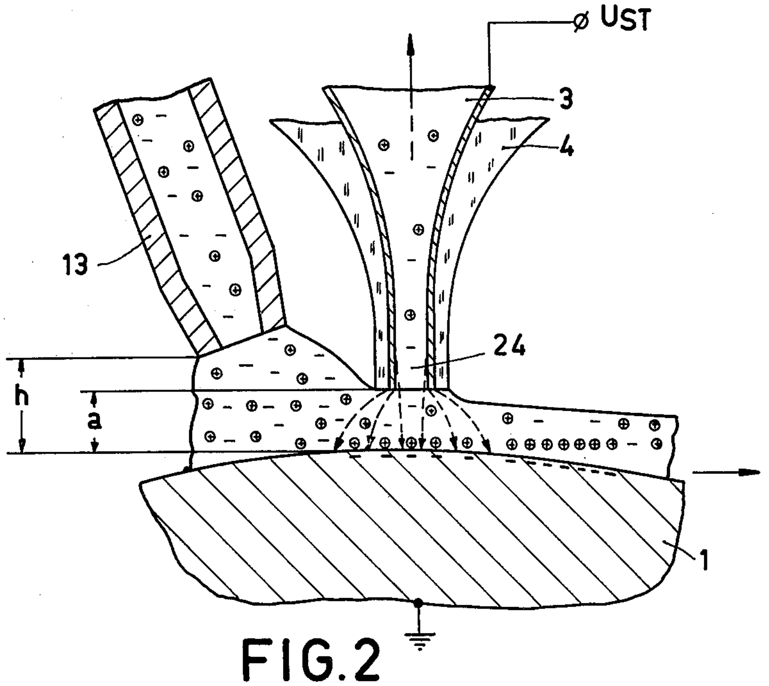
Figure 3:
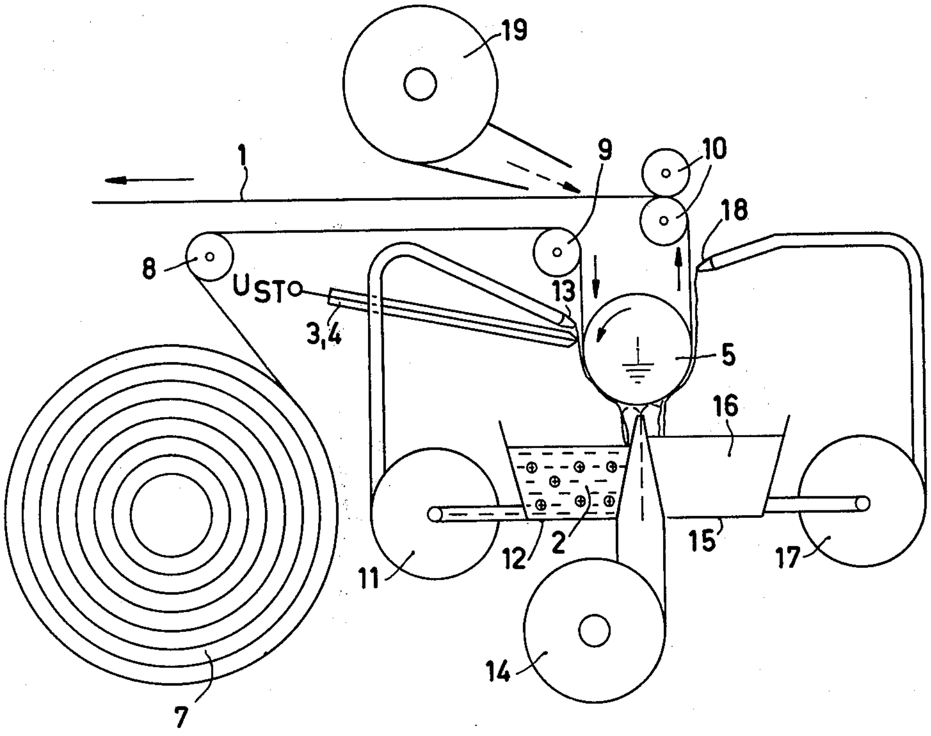
Figure 4:
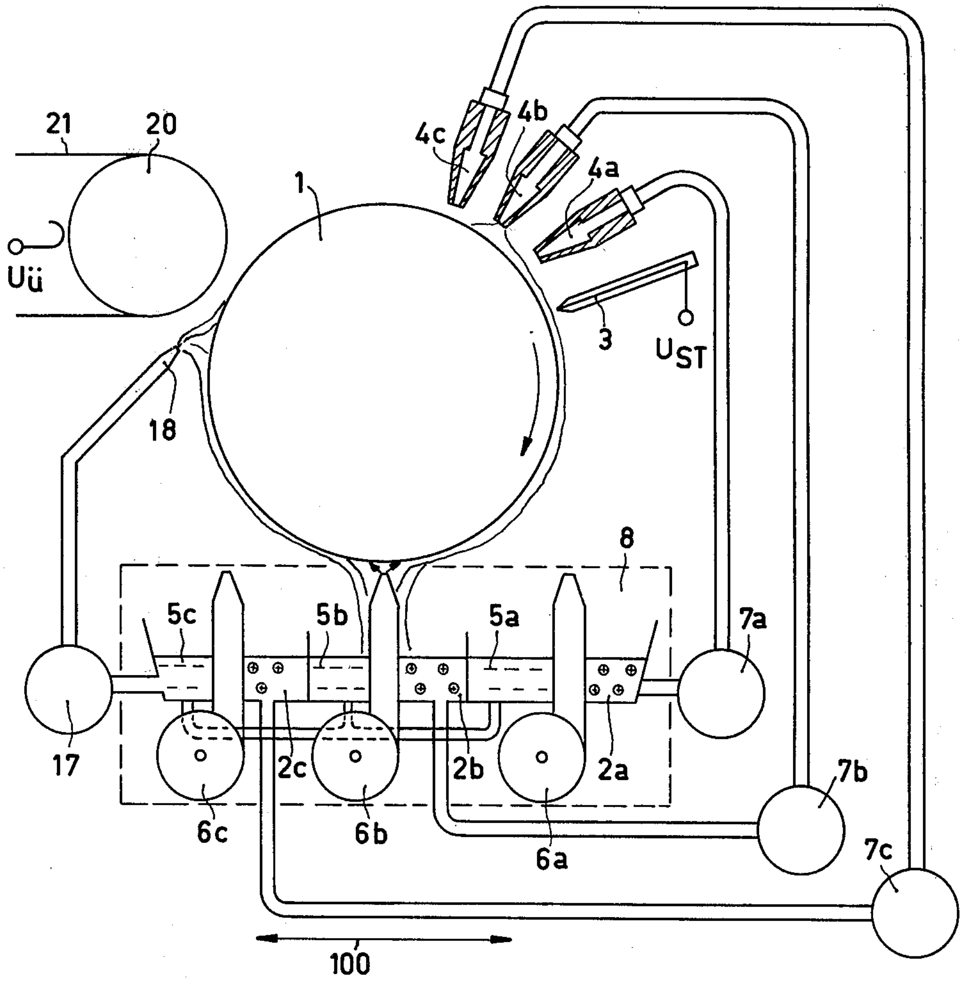
Figure 5:
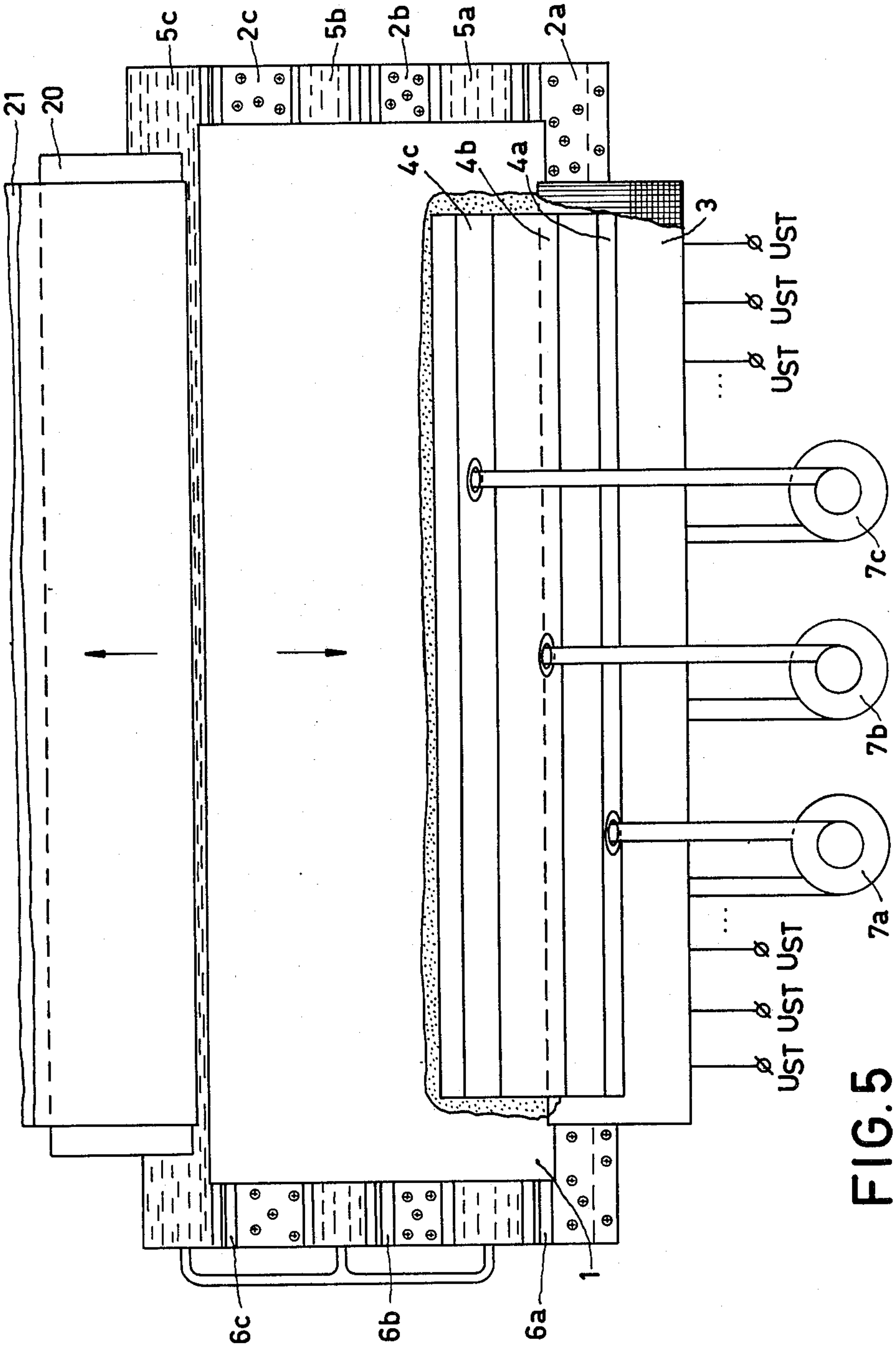
Figure 6:
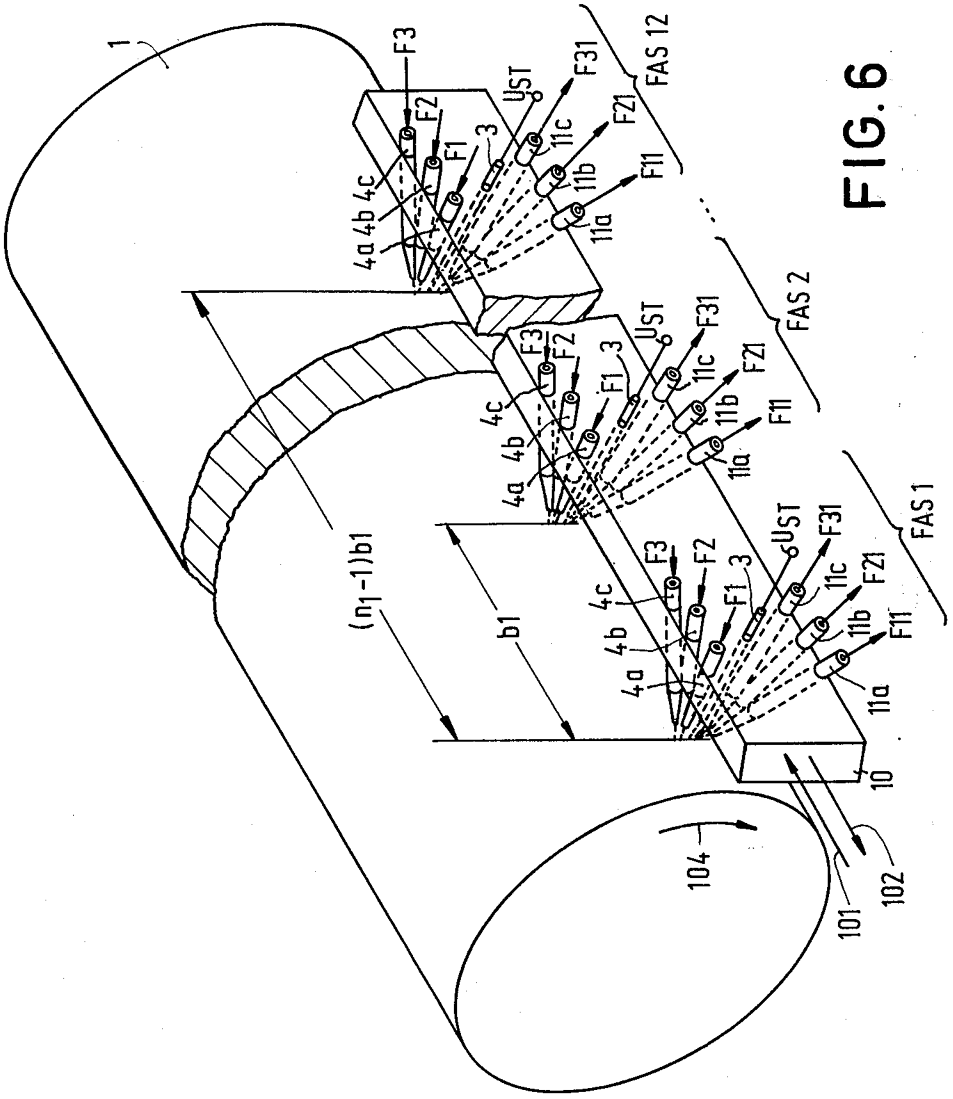
Figure 7:
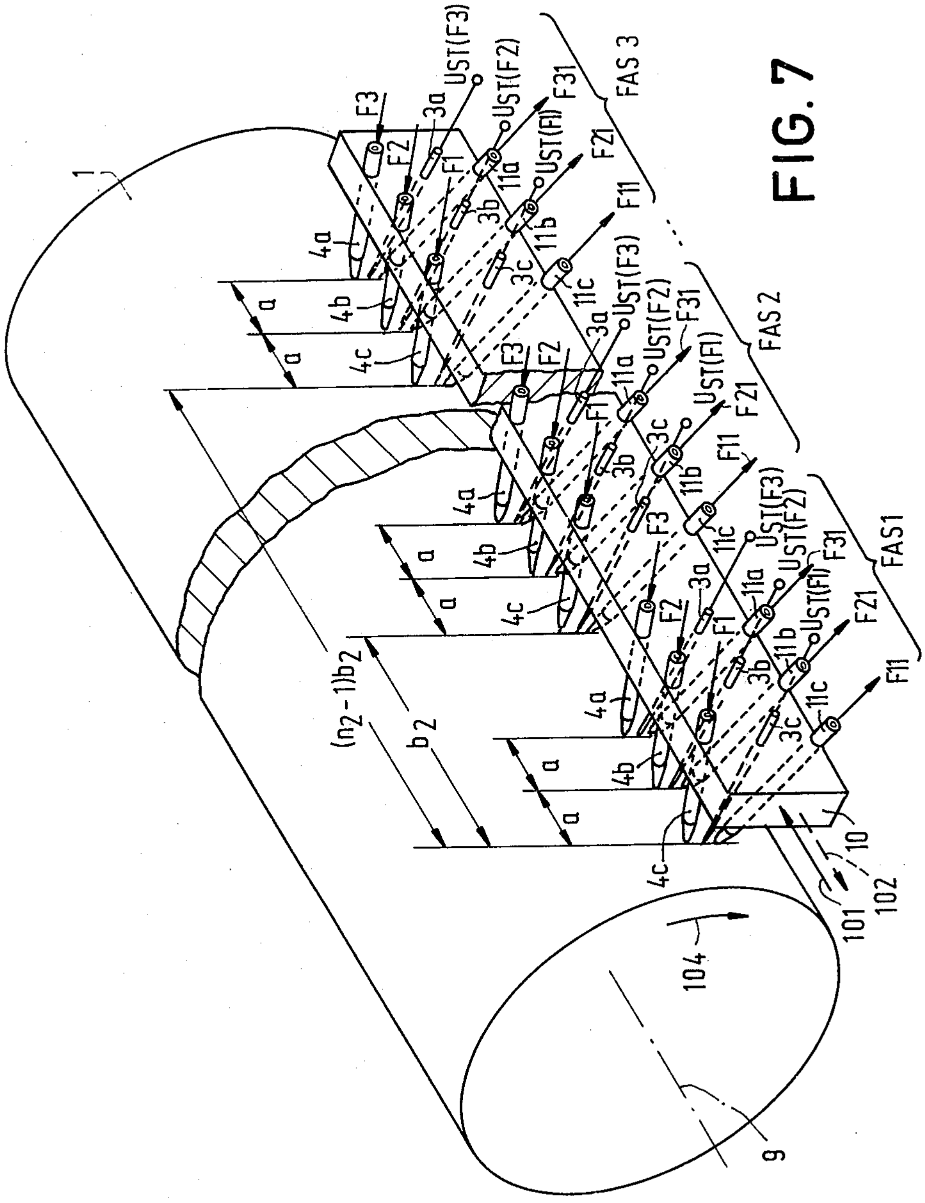
Figure 8:
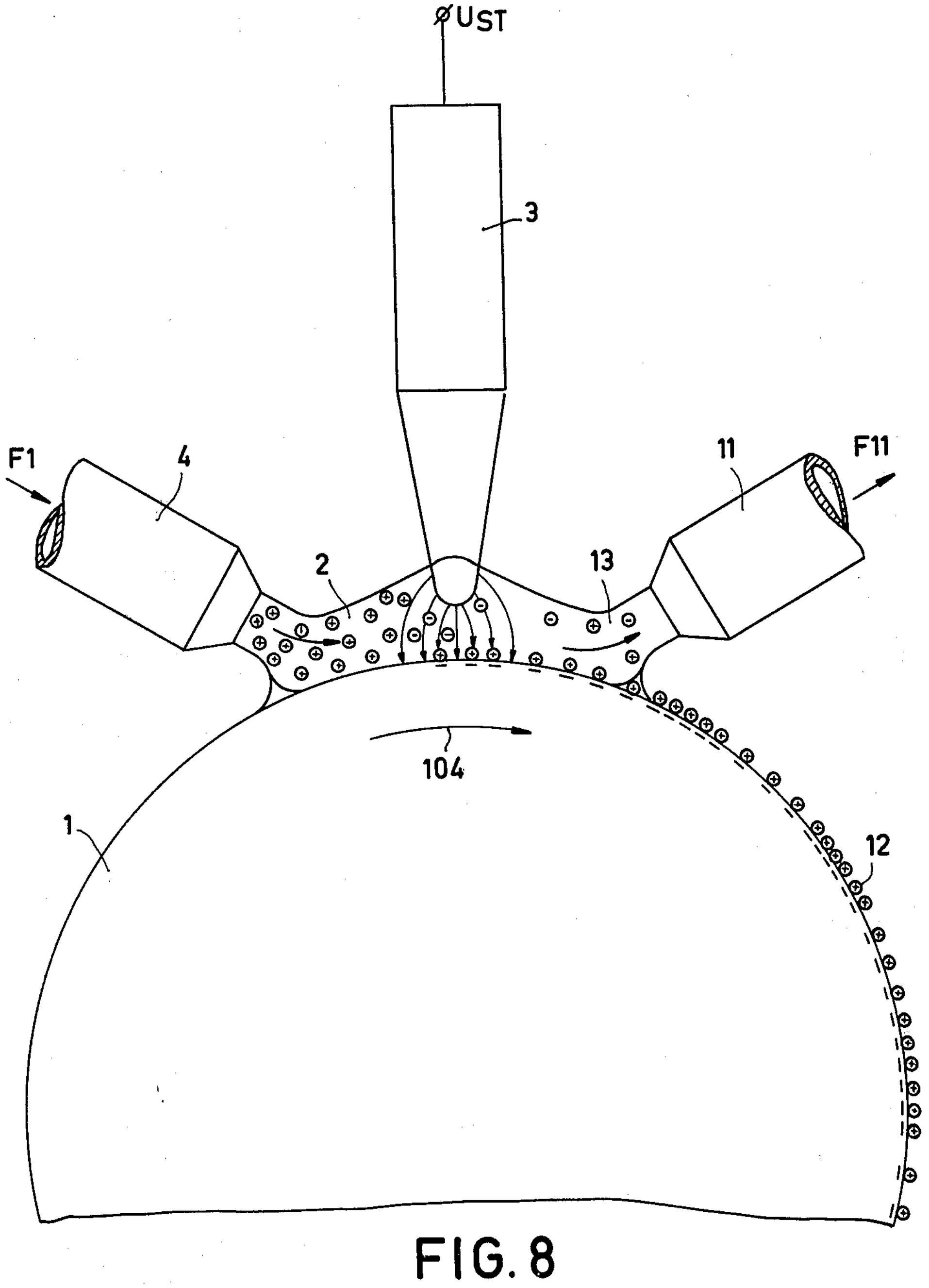

FIG. 1 shows a first embodiment of an electrode which can be used in a printing device in accordans with the invention, FIG. 2 shows a second embodiment of an electrode, FIG. 3 shows an embodiment of a printing device in accordance with the invention in which the image is recorded directly on a strip of paper, FIG. 4 is a side elevation of an embodiment of a printing device in accordance with the invention for multi-color recording, comprising an electrode comb on a conductive rotating drum and a device for transferring the complete color image to the ultimate record carrier, FIG. 5 is a plan view of the device shown in FIG. 4, FIG. 6 is a perspective view of a part of a further embodiment, FIG. 7 is a perspective view of a part of another embodiment, and FIG. 8 shows a detail, at an increased scale, of the devices shown in the FIGS. 6 and 7.

The FIGS. 1 and 2 show two embodiments of the electrodes 3 for a printing device in accordance with the invention. The individual electrodes 3 are arranged for series recording. However, it is alternatively possible to arrange a number of these electrodes adjacently in a row in order to form an electrode comb for parallel recording. In this respect, it is only important that as an assembly they exhibit favorable flow conditions and that their tips are shaped so that a large as possible electric field is present between the electrodes and the image carrier 1 for the deposition of pigment particles on the image carrier when one of the electrodes is connected to a control voltage $U_{ST}$.

The surface of the image carrier 1 which faces the electrodes comprises an electrically conductive layer. This layer is denoted by the reference numeral 1' in FIG. 1.

Furthermore, in FIGS. 1 and 2 all functionally corresponding parts are denoted by the same reference numerals, even though their shape may be different. FIG. 1 shows a simple pin electrode, the tip of which projects from an insulating holder 4, so that the active electric field is larger. For the same purpose, the electrodes may alternatively comprise a round tip or rounded bevelled tip or spherical tip (not shown). FIG. 2 shows a hollow electrode 3 which is shaped as funnel; the purpose of this shape will be described at a later stage.

The following examples of the record carrier 1 are shown: FIG. 1 shows a sheet-like or strip-like image carrier of normal paper or a synthetic material where only the receiving surface 1' is conductive. The conductivity is realized by the introduction of substances, for example, salts or metal layers. Obviously, the image carrier may alternatively consist entirely of a conductive material, for example, ZnO paper. The combination of a transparent substrate of a synthetic material and a transparent metal layer enables recording of transparent images with a high optical density (up to D=3). FIG. 2 shows the image carrier 1 as a metal drum having a wear-resistant surface. This drum is used as a permanent intermediate carrier.

The construction of the counter electrode 5, being connected to the reference potential (in all examples at earth potential =0 V) of the control voltage $U_{ST}$, differs accordingly. A strip-shaped image carrier 1 which is entirely conductive may be guided in continuous contact across a counter-electrode which is constructed as a plate (not shown). In FIG. 1, the counter-electrode 5 which is constructed as a roller or a wiper, is in direct contact with the conductive receiving surface 1'. In FIG. 2, where the image carrier 1 is a metal drum, the reference potential is connected directly to the drum shaft (not shown).

The end of the electrode 3 is situated at a distance a, which may be from 50 to 200 μm, from the surface of the image carrier. The electrode 3 may be constructed as a separate electrode for series recording or as an electrode comb for parallel recording. The electrode comb consists of, for example, five electrodes which are embedded in an insulating body 4 at an image point distance from and parallel to each other. For the recording of a series of points, they are simultaneously or group-wise consecutively connected to the relevant control voltage $U_{ST}$ by the control electronics. The gap between the head of each electrode 3 and the image carrier 1 is filled with liquid developer 2. As will be described in detail hereinafter, an adequate amount of liquid developer 2 is applied to the recording zone by a jet nozzle 13 (not shown in FIG. 1). The thickness h of the liquid developer film is always larger than the gap a between the electrodes and the image carrier 1. The pigment particles suspended in the liquid developer 2 carry a high charge.

For generating an image point, a control signal $U_{ST}$ is applied to the relevant electrode 3. The electric control field thus generated between the image carrier 1, being at reference potential through the counter-electrode 5, and the electrode 3 causes electrophoretic deposition of pigment on the image carrier 1 in a zone underneath the electrode 3 which is determined by the shape and the intensity of the electric field (denoted by broken lines). The quantity of pigment deposited, i.e. the grey value of the image point generated, is proportional to the product of the duration and the voltage value of the control signal $U_{ST}$. Thus, the grey value of such an image point which is proportional to the quantity of pigment deposited can be controlled by variation of the duration or, preferably, by variation of the value of the voltage $U_{ST}$. The point-wise recording of the halftone images is realized during the corresponding relative movement of image carrier 1 and the electrode device 3 by the control signals derived from the image signal.

Up to the fixation of the recorded images, the image-wise deposited, charged pigment adheres to the image carrier 1 mainly under the influence of electrostatic forces. The adherence is intensified by van der Waals forces between pigment particles and the image carrier 1. The ultimate fixation takes place after removal of the liquid developer film, in that the polymer adhesive contained therein bonds the pigment to the image carrier.

In comparison with known methods, the density of the recorded image points (D→3), the recording speed (V→0.5 m/s) and the resolution (→10 points per mm) are exceptionally high due to the use of conductive image carriers 1. The recording speed is further increased by the use of liquid developer 2 in which high-charge pigment is suspended. For the correct reproduction of the grey values of the image points recorded point-wise by relative movement of the electrode 3 and the image carrier 1, the construction of the electrode tip and the enveloping insulating body 4 should be favorable for the flow in order to emable a fast exchange of developer liquid. Therefore, the insulating body 4 has a very slim shape which becomes narrower towards the recording ends of the pin electrodes 3. After the recording of an image point or after the recording of a series of image points, the liquid developer 2 depleted during the preceding recording can thus be replaced by fresh, liquid developer containing pigment in the prescribed and adjusted concentration during the further movement of the image carrier 1 or the electrode device 3 over one image point distance.

In the embodiment of the electrode 3 and the insulating body 4 which is shown in FIG. 1, the fresh liquid developer 2 is applied to the recording zone by a jet nozzle. In the embodiment shown in FIG. 2, where the electrode is formed as a jet nozzle, the fresh liquid developer can be applied to the recording zone in the same way, by the jet nozzle 13, and after each recording the major part of the depleted liquid developer can be removed by this jet nozzle 24 itself. The fresh liquid developer 2, however, can alternatively flow directly to the recording zone by the jet nozzle 24, at the same time forcing the depleted liquid developer out of the recording zone.

FIG. 3 is a side elevation of the principal parts of an embodiment of a printing device for electrophoretic image recording. In this device, recording takes placed on a strip-shaped image carrier 1 which is pulled off a feed roll 7. The image carrier 1 may be a conductive paper or a paper or a foil comprising a conductive receiving surface. For the recording, the image carrier 1 is pulled off the feed roll 7 by a capstan drive and is transported in the direction of the arrow, by the guide rollers 8 and 9 and the counter-electrode 5 which is at a reference potential (0 V) of the control voltage $U_{ST}$. A pump 11 supplies liquid developer 2 from a reservoir 12. This developer is applied, from the jet nozzle 13, to the recording zone of the image carrier 1 above the electrode comb 3, 4 across the full width thereof.

The electrode comb 3, 4 records a full halftone point series across the width of the image carrier. The voltage $U_{ST}$ is applied in known manner to the electrodes in dependence of control signals from the control electronics. After the intermittent or continuous further movement of the image carrier 1 over one point series distance, each time a further point series of a halftone image is recorded.

The developer 2 depleted during the recording flows downwards along the image carrier 1 and substantially removed below the counter-electrode 5, for example, by an airflow produced by a fan 14. The developer then returns to the reservoir 12. After the removal of the major part of the liquid developer 2, the recorded halftone images are successively rinsed with a carrier liquid 16, so that the residual film of liquid developer still present on the image carrier 1 is removed. The pigment still present therein which has not been used during the recording would otherwise cause a disturbing background blackening of the images. The rinsing carrier liquid 16 is carried from a reservoir 15 by a pump 17 and is applied to the image carrier 1 by a jet nozzle 18. The carrier liquid 16 which flows down along the image carrier 1 is again removed underneath the counter-electrode 5 by the airflow from the fan 14 and returns to the reservoir 15. The pigment used up during the image formation and the lost carrier liquid 16 are replenished in known manner by hand or automatically.

During the last process phase, the image carrier 1 is dried by an airflow from a fan 19. The fixation agent present in the liquid developer 2 then bonds the recorded image permanently to the image carrier 1. The recording is subsequently discharged from the apparatus.

FIGS. 4 to 7 show three embodiments of a recording device for point-wise electrophoretic multi-color recording, that is to say all three for the recording of a tri-color image with the three pigments in the colors yellow, cyan and magenta. Using these three colors, all colors of a color image, including the grey values between white and black, can be reproduced on a white image carrier, for example, normal paper which is used as the ultimate carrier 21 of the color recording in all embodiments. Obviously, the color image quality of the multi-color recording method in accordance with the invention can be improved by addition of the fourth color "black". Alternatively, more than three or four colors and colors other than the described colors can be used.

The three pigments are charged and each pigment is suspended in a carrier liquid. The suspension, moreover, contains a bonding agent for permanently bonding the pigment to the image carrier after evaporation of the carrier liquid. The principal element of the recording device is the conductive image carrier 1. It is shaped as a drum and is made of a conductive material, for example, metal, or it comprises a conductive surface, for example, a metal layer. This serves as a permanent intermediate carrier of the tri-color image which is formed thereon by means of the electrophoretic method and which is transferred as a complete color image, consisting of the point-wise exactly registering images in the three colors, to the ultimate carrier 21, for example, normal paper. It is a further advantage of the electrophoretic recording method that the charged pigment particles which are deposited in the correct quantity for each color, i.e., with the correct optical density, under direct electric control by a corresponding control voltage $U_{ST}$ applied to the electrodes, are correctly adjacently deposited and distributed for all image points across the surface of the image carrier where they are maintained in position by electric mirror charging and mechanical forces (van der Waals forces) without flowing beyond the boundaries of the image points at a later stage.

The simultaneous and hence fast transfer of the electrophoretically recorded tri-color image on the drum 1 in its entirety is realized by the synchronous rolling of the ultimate record carrier 21 (normal paper) on the surface of the drum 1 which carries the color image. The record carrier 21 and the surface of the drum 1 are brought into a comparatively intimate mechanical contact by means of the transfer roller 20. The transfer of the tri-color image takes place by the electric field forces which are generated by application of a transfer voltage $U_u$ to the transfer roller 20. Subsequently, it is necessary to clean the drum 1. The fixation of the transferred multi-color image is realized in known manner by the added bonding agent after evaporation of the carrier liquid.

FIGS. 4 and 5 show a complete recording device for the electrophoretic recording of a tri-color image by means of a stationary electrode comb 3. This device records a complete line of image points in parallel and simultaneously. As has already been described, this comb consists of a row of electrode pins which are arranged parallel adjacent each other and which are associated with the line of image points. The recording end faces of the electrode pins which extend at an angle of 90° above the surface of the drum 1 are situated at a distance of from approximately 50 to 200 μm from the drum surface. For the recording, each time a sufficient amount of pigment suspension flows through this gap. The electrophoretic deposition of the correct quantity of pigment of a given color on the drum 1 is determined for each image point of a line of points by the image-wise modulated control voltages $U_{ST}$. The line-wise recording of the tri-color images is point-wise performed consecutively for each color on the rotating drum 1. The accuracy is obtained in that the drum 1 and the electrode comb 3 are rigidly arranged with respect to each other and a reproducible control signal is given by a position generator (not shown) which is coupled to the drum 1.

If a tri-color image is to be recorded, for example, starting with the color yellow, the suspension 2a containing the yellow pigment is pumped from the reservoir by the pump 7a to the supply pipe 4a and is applied to the rotating image carrier 1, across the full recording width, just before the electrode comb 3. The yellow image is formed from the yellow suspension 2a which flows through the gap between the surface of the drum 1 and the electrode comb 3 by the image-wise electrically actuated electrode comb by way of electrophoretic deposition of pigment during a rotation of the drum. The yellow suspension 2a, being depleted accordingly during the recording and flowing along the drum, is removed underneath the drum 1 by means of an airflow from a fan 6a and is returned to the reservoir for the yellow suspension 2a. Used up toner and carrier liquid are replenished automatically or by hand (not shown).

The residual yellow toner which remains on the drum after this coarse removal and which could cause a a disturbing fog in the colour image, is removed at the rear of the drum 1 by means of a rinsing liquid 5a which is applied across the full width of the surface by means of a jet nozzle 18. The rinsing liquid is preferably the carrier liquid of the pigment suspensions. The rinsing liquid 5a is supplied from the relevant reservoir by the pump 17. The rinsing liquid then flows downwards along the drum 1, is removed by means of the airflow from the fan 6a, and is returned to the reservoir 5a.

Subsequently, the electrophoretic recording takes place of the second color image with the suspension 2b, for example, containing cyan pigment. After completion of the cleaning of the second color image with rinsing liquid, the third and last recording takes place with the suspension 2c which contains, for example, magenta pigment.

The suspensions 2a to 2c are each time supplied from the relevant reservoirs by the pumps 7a to 7c. They are applied to the drum 1 by means of the pipes 4a to 4c. The cleaning of the images by means of the rinsing liquids 5a to 5c is realized by means of the pump 17 and the jet nozzle 18. The relevant suspension and the rinsing liquid are removed by the fans 6a to 6c.

In synchronism with the recording of the tri-color image, the carriage 8, accommodating the reservoirs for the pigment suspensions 2a, 2b and 2c and the rinsing liquids 5a to 5c, the latter three reservoirs being interconnected by ducts, and the fans 6a to 6c, is moved intermittently further in the direction of the arrow 100, so that during the application of a color, the associated color reservoir and the fan are situated underneath the drum 1. At the end of the recording of the complete color image, the carriage 8 is returned to the starting position.

The stationary jet nozzles 4a, 4b and 4c and the rinsing pipe 18 are movably connected to the pumps 7a, 7b and 7c and 17 by way of tubes.

As has already been described, the complete tri-color image recorded on the drum 1 is transferred to the ultimate record carrier 21 in one step, and hence fast and accurately.

The devices which are shown in principle in the FIGS. 6 and 7 enable series-parallel electrophoretic multi-color recording on a rotating conductive drum 1 which serves as a permanent intermediate carrier of the complete multi-color image. An insulating holder 10 which is slidable to and fro, parallel to the surface of the drum 1, in the arrow directions 101, 102, comprises several separate pin-shaped electrodes 3 which are adjacently arranged and associated jet nozzles 4a, 4b, 4c and suction pipes 11a, 11b, 11c, the electrodes extending at an angle of 90° with respect to the surfaces. The recording end faces thereof are situated at a distance of from 50 to 100 $\mu m$ from the surface of the drum 1. During rotation of the drum 1, if an adequate amount of suspension 2 with charged pigment of each time one color is supplied by nozzles 4, the individual electrodes 3 electrophoretically record point-wise, that is to say each electrode serially and all electrodes in parallel, an image point column in one color. The deposition of the correct quantity of charged pigment in accordance wit the image information is controlled by the control voltage $U_{ST}$ which is applied to the electrodes and which is image-wise modulated. The suspension whose pigment has been used up during the recording is removed directly behind the electrodes 3 by suction pipes 11. All separate electrodes 3 are displaced with the holder 10 either during a rotation of the drum 1, laterally in the indicated arrow directions 101, 102, continuously over one image point column distance, or intermittently during each rotation, so that each electrode 3 each time records a corresponding part of the image in columns. The electrode distance b1 amounts to a multiple of the width of the intermediate image point columns.

In the devices for serial electrophoretic multi-color recording, the device for removing the pigment suspension of a color 2 directly behind the electrodes 3 by means of suction pipes 11 deviates from the device for the removal of the suspension of a color 2 by means of an airflow underneath the drum 1 which is used in the recording device for parallel electrophoretic multi-color recording as shown in FIG. 4 for two reasons: the effective use of the latter removal device would necessitate the use of a number of such devices equal to the number of individual electrodes 3. The use of the suction devices 11 reduces this large number. A further advantage will be described with reference to FIG. 8.

FIG. 8 shows, at an increased scale, the serial electrophoretic recording, using separate electrodes 3 according to FIG. 6 or 7, on the basis of an example involving the recording of the image of one color. During the rotation of the drum 1 in the direction of the arrow 104, the pigment suspension 2 containing the pigment of one color, for example, yellow, is deposited by the jet nozzle 4 in the direction of the arrow F1, said suspension containing, after departure from the recording zone which is determined by the area of the individual electrode 3, a more or less large content of pigment which has not been used during the image-wise electrophoretic recording. If this suspension 13 is removed only at the lower side of the drum 1, as shown in FIG. 4, it will contact the surface of the image carrier 1 with the image 12 over a large area. Consequently, electric and mechanical forces can then irregularly deposit a given part of this pigment on the drum 1. This, the recording is adversely influenced (color or grey shadow). Coarse removal of the pigment irregularly deposited on the surface is no longer possible by the subsequent rinsing. Because the depleted suspension 13, with the pigment still present therein, leaves the recording zone by the suction pipe 11 in the direction of the arrow F11, and it is withdrawn directly behind the electrode 3, the undesirable deposition of pigment is significantly reduced. Moreover, like in the device shown in FIG. 4, a rinsing operation can subsequently be performed, so that the pigment-containing suspension still present after the coarse removal is also removed. The image-wise electrophoretically deposited pigment particles adhering to the image carrier 1 due to electric and mechanical forces form the colored image 12 after the removal of the depleted developer liquid 13.

FIG. 6 shows the first one of the series/parallel recording devices. The electrodes 3 and the associated jet nozzles 4 and suction pipes 11 form n color recording sets of a first kind. The number of jet nozzles 4 and suction pipes 11 is dependent of the number of colors used for the multi-color recording. For the reproduction of tri-color images, each color recording set FAS of the first kind has associated with it three jet nozzles 4 and three associated suction pipes 11 for the suspension 2 with the pigments of the colors yellow, cyan and magenta. Like in the embodiment shown in FIG. 4, the jet nozzles 4 are arranged at a short distance before the electrodes 3 and the suction pipes 11 are situated directly therebehind. The pipes 4 and 11 are associated pair-wise with the pigment suspensions of a colour 2 and are symmetrically arranged with respect to the electrode 3; they are aligned and shaped so that the suspension 2 of the relevant color which is each time deposited on the rotating drum by the relevant jet nozzle 4 for the recording of the images of the three colors is applied to the recording zone with a width and a thickness which are sufficient for the electrophoretic recording of an image point column, after which it is removed by the relevant suction pipe 11.

The number $n_1$ of color recording sets of the first kind, being arranged at a regular distance $b_1$ across the recording width, is determined by the desired recording time or possibly by predetermined manufacturing costs. The more recording sets are present, the faster the recording will be. The number or the distance is limited only by the dimensions of the systems.

For the recording of a tri-color image on the rotating drum 1, the suspension 2*a* which contains, for example, pigment of the color yellow, is applied to the recording zone of the electrodes 3 (F1) by all jet nozzles 4*a* for the recording of the first color. During the continuous or intermittent displacement of the color recording sets FAS with the holder 10, for example, to the right, all electrodes 3 each time record in parallel controlled image-wise by the applied control voltages $U_{ST}$, with an image point column of the associated image part with the correct color value, image point wise and serially during each rotation of the drum 1. The depleted pigment suspension is removed from the drum for each set by the suction pipes 11*a* (F11). The displacement of the color recording sets FAS with the holder 10 is stopped when all image point columns of the associated image parts having a width b1 of the image of the first color have been recorded. After the returning of the holder 10 to the starting position, the recording of the image of the second color is performed in a point-column-wise accurately registering manner. By all jet nozzles 4*b*, the suspension 2*b* containing the cyan pigment is applied to the recording zone (F2). Electrodes 3 are image-wise driven for the recording of the second color. The removal of the depleted suspension takes place by the suction pipes 11*b* (F21). After the recording of the image parts of the second color on the image of the first color, the image of the third color is recorded with the suspension 2*c* containing magenta pigment. The suspension 2*c* is applied by the jet nozzles 4*c* and is removed by the suction pipes 11*c*.

After the recording of each image of one color, the pigment which has not been image-wise deposited is removed by means of a rinsing liquid during one or more rotations of the drum 1. Subsequently, the image is transferred to an ultimate carrier 21 in the manner described with reference to FIG. 4.

FIG. 7 shows a further series/parallel electrophoretic multi-color recording device. Each color recording set (FAS) consists of three separate electrodes 3*a* to 3*c*, three jet nozzles 4*a* to 4*c*, and three suction pipes 11*a* to 11*c* for recording each time the image of one color. This is a color recording set of the second kind. For tri-color recording, each color recording set comprises three electrodes and each time three associated pairs of pipes 4 and 11 which are adjacently arranged in series in the holder 10 which is deplaceable in the direction of the arrows 101, 102. The color recording sets of the second kind have the same mutual distance b2 across the overall recording width. The number n2 of the sets, or their distance b2, is determined, like for the first series/parallel recording device, by the desired recording time or by the manufacturing costs. In a color recording set of the second kind, all electrode and jet nozzle devices are situated at the distance a from each other. The relevant sequence of assignment of electrode and jet nozzle devices to the color to be recorded thereby is the same for all color recording sets of the second kind. The minimum distances a and b2 are determined either by the dimensions of the electrode and jet pipe devices or by the spreading of the pigment suspensions 2 applied to the drum 1. Because all neighbouring electrode and jet pipe devices record a different color, the distances a and b2 must be chosen for reasons of safety so that the suspensions 2 cannot run one into the other. For the recording of the image of the first color, all jet nozzles 4*a* deposit the suspension 2*a*, containing, for example, yellow pigment, on the rotating drum 1. The assembly of color recording sets of the second kind is continuously or intermittently displaced to the right by way of the holder 10. The image-wise electrophoretic recording of the yellow image is realized with the correct color value by the activated associated individual electrodes 3*a*, that is to say image-point-wise serially with each rotation of the drum 1 and per image point column in parallel with the associated image part. The depleted suspension is removed by the suction pipes 11*a*.

After the displacement of the holder 10 over a distance a for one color, that is to say after the recording of a corresponding number of yellow image point columns, all electrode and jet pipe devices for the recording of a second color, for example, with the suspension 2*b* containing cyan pigment, have reached the position in which each time the first yellow image point columns have been recorded. The image-column-wise coincident recording of the image of the second color on the first color then commences. All jet nozzles **4*b* deposit the suspension 2*b* containing cyan pigment in the recording zone of the electrodes 3*b*, which are activated for the image-wise recording of the image of the second color. The depleted suspensions are removed from the drum 1 by the suction pipes 11*b*. The recording of the image parts of the first and the second color now take place simultaneously. After the displacement of the color recording sets of the second kind with the holder 10 over the distance a, the recording of the image of the third color commences with the suspension 2*c* with magenta pigment; like for the recording of the two other colors, use is made of the jet nozzles 4*c*, the electrodes 3*c* which are image-wise activated for the recording of the third color, and the suction pipes 11*c*.**

All image parts of the three colors are then simultaneously recorded. When all color recording sets of the second kind have been displaced together over the distance b2 with the holder 10, the recording of the image parts of the image of the first color yellow has been completed, and each time after further displacement over the distance a, the recording of the cyan image has been completed, and after a further displacement over the distance a the recording of the magenta image has been completed.

What is claimed is:

1. A printing device using electrophoretic recording comprising:

a movable image carrier having an electrically conductive surface, at least one electrode relatively movable with respect to said image carrier and separated by distance a from said image carrier, means for continuously supplying developer fluid containing electrophoretic pigment particles to a depth h greater than said distance a on said image carrier at least adjacent to said electrode for wetting said at least one electrode, means for applying an electric field between said image carrier and said at least one electrode, and means for removing depleted developer fluid from said image carrier.

2. A printing device according to claim 1, wherein said means for supplying developer fluid on said image carrier includes a jet nozzle arranged adjacent to said at least one electrode.

3. A printing device according to claim 2, wherein said means for removing depleted developer fluid is located adjacent to said at least one electrode but opposite from said jet nozzle.

4. A printing device according to claim 3, wherein said means for removing depleted developer fluid includes a further jet nozzle located on an opposite side of said at least one electrode from said first jet nozzle, and wherein a carrier fluid for removing residual films of said developer fluid is applied to said image carrier through said further jet nozzle.

5. A printing device according to claim 4, wherein said electrophoretic pigment particles have a high electric charge.

6. A printing device according to claim 3, wherein a plurality of said jet nozzles are arranged one beside the other adjacent to each of said at least one electrode, each of said plurality of jet nozzles applying said developer fluid with a specific color pigment.

7. A printing device according to claim 6, wherein three of said jet nozzles are arranged with each jet nozzle passing respectively pigment of the colors yellow, cyan, and magenta.

8. A printing device according to claim 2, wherein said image carrier is on a surface of a rotating drum, and wherein for each color of said developer fluid a respective one of said jet nozzle is provided in association with a respective one of said at least one electrode on a holder which is journalled parallel to an axis of rotation of said drum and separated from the drum surface.

9. A printing device according to claim 8, wherein after deposition of pigments of all colors on said image carrier, a complete multicolor image is transferred to a record carrier from said image carrier acting as an intermediate carrier.

10. A printing device according to claim 3, wherein said means for removing depleted developer fluid includes a chamber for suction of depleted developer fluid from said image carrier.

11. A printing device according to claim 10, wherein a plurality of jet nozzles are arranged with each of said at least one electrode together with associated ones of said suction devices to form a color recording set (FAS) of a first kind.

12. A printing device according to claim 10, wherein each of said at least one electrode is associated with a jet nozzle for providing a color suspension and a suction device for removing said color suspension with the number of such combinations corresponding to the number of colors to be recorded, thereby forming a color recording set of the second kind.

13. A printing device according to claim 12, wherein all said jet nozzles, suction devices, and electrodes are formed in triplets each situated adjacently to one another at the same distance on a holder which is parallel to the image carrier.

14. A printing device according to claim 2, wherein said at least one electrode is funnel shaped with a funnel opening for removal of said depleted developer fluid from said image carrier.

15. A printing device according to claim 1, wherein said means for removing depleted developer fluid includes a fan having an airflow directed onto said image carrier.

* * * * *

UNITED STATES PATENT AND TRADEMARK OFFICE
CERTIFICATE OF CORRECTION

PATENT NO. : 4,330,788

DATED : May 18, 1982

INVENTOR(S) : HANS D. HINZ ET AL

It is certified that error appears in the above—identified patent and that said Letters Patent is hereby corrected as shown below:

Column 5, Line 22, change "placed" to --place--.

Signed and Sealed this

*Thirty-first* Day of *August 1982*

[SEAL]

*Attest:*

GERALD J. MOSSINGHOFF

*Attesting Officer* *Commissioner of Patents and Trademarks*